United States Patent
Jeunehomme et al.

(10) Patent No.: US 11,752,937 B2
(45) Date of Patent: Sep. 12, 2023

(54) SENSOR-BASED TRIM ELEMENT WARNING SYSTEM, ASSOCIATED VEHICLE AND METHOD

(71) Applicant: FAURECIA AUTOMOTIVE INDUSTRIE, Nanterre (FR)

(72) Inventors: Franck Jeunehomme, Montherme (FR); Maxime Fayard, Charleville-Mezieres (FR); Anne-Sophie Debruyne, Charleville-Mezieres (FR)

(73) Assignee: FAURECIA AUTOMOTIVE INDUSTRIE, Nanterre (FR)

( * ) Notice: Subject to any disclaimer, the term of this patent is extended or adjusted under 35 U.S.C. 154(b) by 131 days.

(21) Appl. No.: 17/317,681

(22) Filed: May 11, 2021

(65) Prior Publication Data
US 2021/0380038 A1 Dec. 9, 2021

(51) Int. Cl.
*G08B 21/00* (2006.01)
*B60Q 9/00* (2006.01)
*B60R 13/02* (2006.01)

(52) U.S. Cl.
CPC .............. *B60Q 9/00* (2013.01); *B60R 13/02* (2013.01)

(58) Field of Classification Search
CPC .......... B60Q 9/00; B60R 13/02; G08B 21/22; G08B 29/188; G08B 21/24
USPC ............................................... 340/459
See application file for complete search history.

(56) References Cited

U.S. PATENT DOCUMENTS

| | | | |
|---|---|---|---|
| 2005/0057350 A1 | 3/2005 | Younse | |
| 2007/0029768 A1* | 2/2007 | Clos | B60R 21/01532 340/573.4 |
| 2007/0052529 A1* | 3/2007 | Perez | B60N 2/002 340/457 |
| 2011/0074565 A1 | 3/2011 | Cuddihy | |
| 2015/0054647 A1* | 2/2015 | Edwards | G08B 21/22 340/568.1 |
| 2016/0217675 A1* | 7/2016 | Schroeder | H02J 50/90 |
| 2017/0232887 A1 | 8/2017 | Clontz | |

(Continued)

FOREIGN PATENT DOCUMENTS

EP 3505394 A1 7/2019

OTHER PUBLICATIONS

French Search Report corresponding to French Application No. FR 2004652, dated Dec. 21, 2020, 2 pages.

*Primary Examiner* — Mark S Rushing
(74) *Attorney, Agent, or Firm* — REISING ETHINGTON P.C.

(57) ABSTRACT

A warning system that includes a first sensor configured to measure a first signal representative of the state of a door, at least one trim element having at least one second sensor configured to measure a second signal representative of a force applied to the trim element. The system also includes a warning computer and a warning device to communicate warning data to a user. The computer includes: an acquisition module configured to acquire the first signal and the second signal, a determination module configured to determine the warning data based on the first and second signals. The determination module is configured to determine the warning data if the first signal is representative of an open state of the door and if the second signal is representative of an applied force greater than a threshold force.

12 Claims, 6 Drawing Sheets

(56) References Cited

U.S. PATENT DOCUMENTS

| | | |
|---|---|---|
| 2018/0056814 A1 | 3/2018 | Tanyi |
| 2018/0276974 A1* | 9/2018 | Talty .................... H04L 67/306 |
| 2019/0202386 A1 | 7/2019 | Kumar |
| 2019/0251376 A1* | 8/2019 | Stoffel ............... G01C 21/3407 |
| 2021/0082272 A1* | 3/2021 | Morrison ................. B60N 2/26 |
| 2021/0404816 A1* | 12/2021 | Kim .................... B60W 60/001 |

* cited by examiner

SENSOR-BASED TRIM ELEMENT WARNING SYSTEM, ASSOCIATED VEHICLE AND METHOD

TECHNICAL FIELD

The present invention relates to a warning system for installation in a vehicle, the system comprising:
a first sensor, configured to measure a first signal representative of the state of a door of the vehicle, the state of the door being selected between an open state and a closed state,
at least one vehicle trim element comprising:
  at least one support layer,
  at least one appearance layer, and
  at least a second sensor, configured to measure a second signal representative of a force applied to the said trim element,
a warning computer comprising:
  an acquisition module, configured to acquire the first signal from the first sensor and the second signal from the second sensor, and
  a determination module, configured to determine warning data based on the first signal and the second signal, and
a warning device, configured to receive the warning data and to communicate the said warning data to a user.

The invention applies more particularly to warning systems intended to communicate data to a user in the passenger compartment of a vehicle.

BACKGROUND

Vehicles, primarily motor vehicles, nowadays include an increasing number of warning systems. These systems comprise sensors to inform a vehicle user of the state of the vehicle. In addition, these systems comprise warning computing devices connected to the sensors, configured to process the signals from the various sensors and to generate suitable data to be communicated to the user. This data can be visual and may, for example, correspond to a symbol displayed on a display screen or the activation of a warning light. Other data may, for example, be audible data such as an alarm.

Vehicle warning systems comprising at least one sensor in a vehicle trim element are known, for example, from US 2019 0202386 A1. Such warning systems are used, for example, to detect the presence of a user in a vehicle, in particular by measuring the force exerted by the user on the vehicle trim, for example, while seated in the vehicle.

In some cases, it is possible for the user to drop an object into the vehicle without the fallen object being detected. Objects left in the vehicle may include, for example, a wallet, telephone, keys, or any other small object that the user may leave in the vehicle.

SUMMARY

To improve the comfort of the vehicle user, it is advantageous to ensure that the user does not leave any object in the vehicle.

Therefore, one object of the invention is to provide a system to warn the vehicle user if an object is left in the vehicle.

For this purpose, there is provided a warning system in which the determination module is configured to determine a warning data if the first signal is shown to be representative of an open state of the door and the second signal is representative of a force applied to the trim element in excess of a predetermined threshold force.

A determination module configured to determine a warning data based on the condition of a door, especially an open door condition, but also a force on a trim element is particularly advantageous for alerting a user of having left an object in a vehicle. Such a module makes it possible, especially, to determine when a user leaves the vehicle forgetting an object in the vehicle and, in particular, to inform the user of this fact.

Depending on other advantageous aspects of the invention, the warning system comprises one or more of the following features, taken in isolation or in any technically possible combination:
  the determination module is configured to determine a warning data if the second signal, representative of a force applied to the trim element, greater than a predetermined threshold force is acquired by the acquisition module prior to the acquisition of the first signal representative of an open state of the door;
  the predetermined threshold force corresponds to a pressure of between 3 $kg/m^2$ and 10 $kg/m^2$;
  at least one appearance layer forms a carpet layer and at least one support layer forms a sound absorption layer;
  each second sensor comprises:
    a first electrode of the second sensor,
    a second electrode of the second sensor, and
    a sensing foil disposed between the first electrode and the second electrode, the resistivity of the sensing foil depending on the force applied to the said sensing foil;
  the trim forms a vehicle floor, the trim being intended to extend between the seats and a body floor of the said vehicle;
  the trim comprises a plurality of second sensors at least partially offset from each other in a direction tangential to the appearance layer to form a line or matrix of second sensors;
  the determination module is configured to determine a warning data as a function of the first signal and the second signal from each second sensor, the warning data being determined as a function of the second sensor(s) measuring a second signal representative of a force greater than a predetermined threshold, the warning data comprising location information calculated from the signal received from each second sensor;
  the warning device is configured to communicate the warning data visually and/or audibly;
  the or each second sensor is disposed between the at least one support layer and the at least one appearance layer; and
  the second sensor(s) cover(s) at least 3% of the surface of the at least one appearance layer.

The invention further relates to a vehicle comprising a warning system as aforesaid.

The invention further relates to a warning method for implementation in a vehicle by means of a warning system as aforesaid, comprising the following steps:
  acquisition of a second signal representative of a force applied to the trim element greater than the predetermined threshold force, and then
  acquisition of a first signal representative of an open state of the door, then
  determination of a warning data according to the first signal and the second signal, then
  communication of the warning data to a user.

BRIEF DESCRIPTION OF THE DRAWINGS

The invention will be better understood by reading the following description, given only as a non-limiting example and made with reference to the drawings on which.

DETAILED DESCRIPTION

In the following description, a direct orthonormal base (X, Y, Z) is considered. The direction of elevation Z is defined according to the height of the vehicle and corresponds, for example, to the vertical direction when the vehicle is on a horizontal road. The longitudinal direction X corresponds to the front and rear direction of the vehicle and the transverse direction Y corresponds to the width of the vehicle.

The terms "front" and "rear" are defined in relation to the longitudinal direction X in the normal direction of travel of the vehicle. The terms "left" and "right" are defined in relation to the transverse direction Y in the normal direction of travel of the vehicle. The terms "upper" and "lower" and "top" and "bottom" are defined in relation to the direction of elevation Z.

Figure 1:
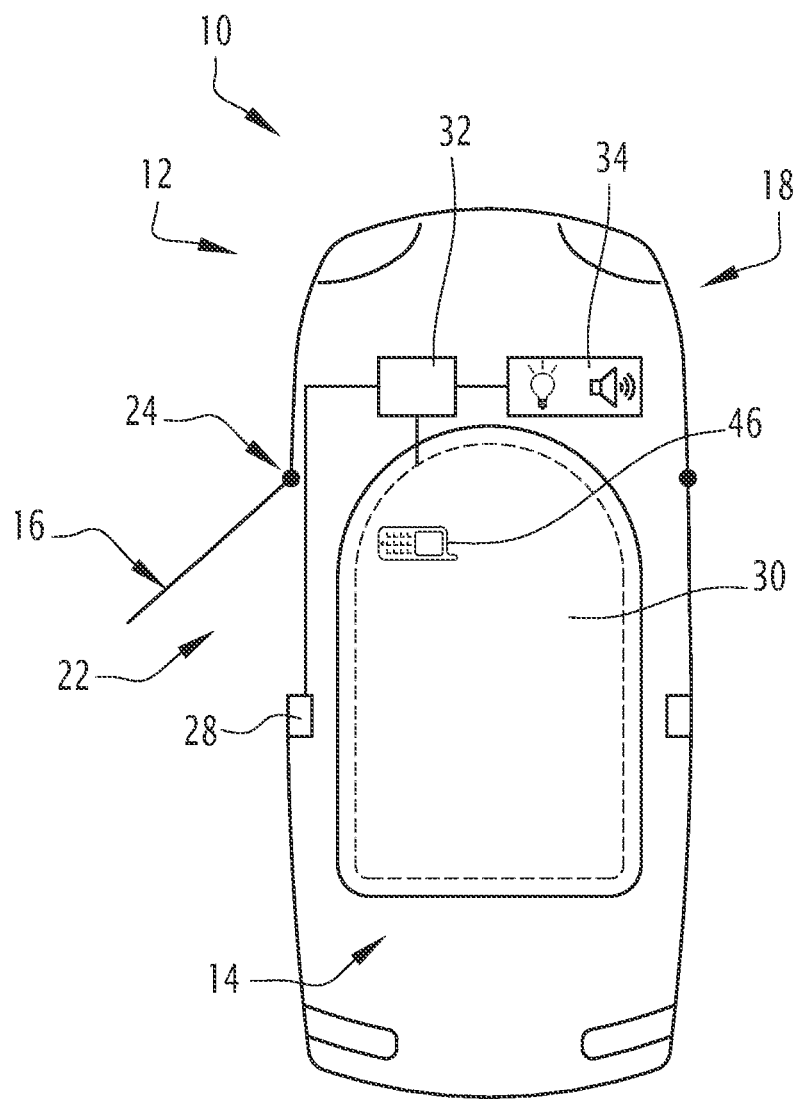
FIG. 1 is a schematic representation seen from the top of a vehicle comprising a warning system according to an embodiment of the invention.

With reference to FIG. 1, a vehicle 10 comprises a bodywork 12 defining internally a passenger compartment 14 of the vehicle, at least one door 16 movable relative to the bodywork 12 and a warning system 18.

The vehicle 10 is for example, a motor vehicle and is preferably a car. Alternatively, the vehicle 10 is a vehicle such as a bus or truck.

Figure 2:
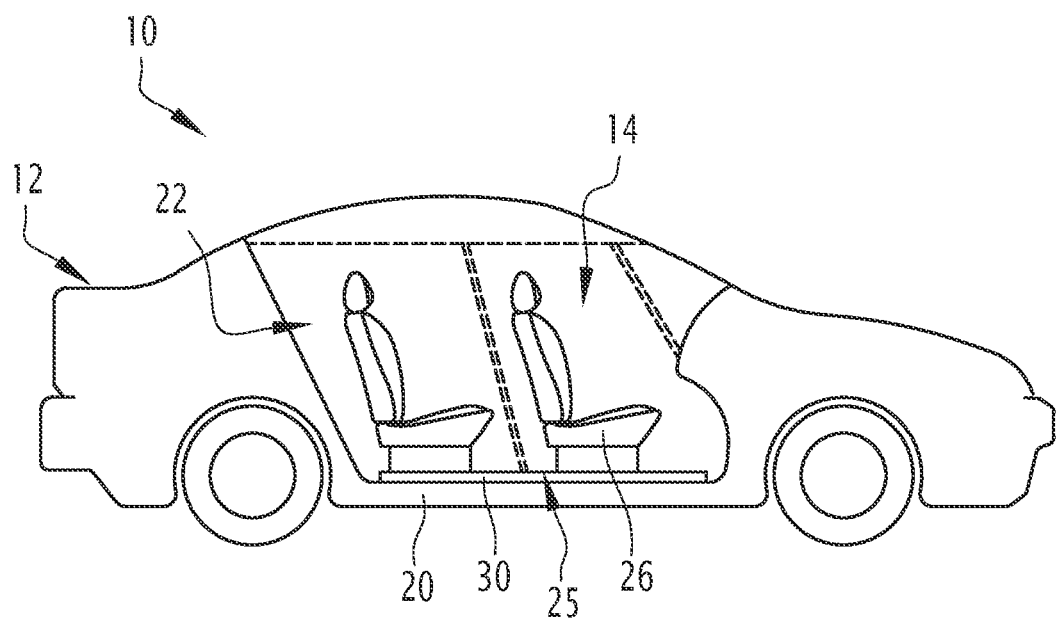
FIG. 2 is a schematic representation when viewed from the side of the vehicle shown in FIG. 1.

As shown in FIG. 2, the body 12 comprises a lower vehicle body panel 20 extending under the vehicle 10. The body 12 defines at least one opening 22 above the lower vehicle body panel 20. The, or each opening 22 is intended to accommodate one, respectively the door 16. Each opening 22 then forms a passageway between an interior of the passenger compartment and an exterior of the passenger compartment.

The body 12 preferably includes a guide mechanism, for example, a hinge 24 to guide the movement of the door 16 relative to the body 12.

The door 16 is movable with respect to the body 12 between an open and a closed position. The open position of the door 16 corresponds to the position in which the door is offset from the opening 22. In contrast, the closed position of the door 16 corresponds to the position in which the door closes the opening 22.

The open position of the door 16 is, for example, adapted to allow the entry or exit of passengers and/or the insertion or removal of objects from the passenger compartment 14.

The closed position of the door 16 is, for example, adapted to block the entry and exit of passengers into or out of the passenger compartment 14 and/or the insertion and removal of objects from the passenger compartment 14.

The person skilled in the art will understand that the door 16 means not only a side door of vehicle 10 but also a tailgate of a boot of the vehicle 10, for example at the rear of the vehicle.

The passenger compartment 14 preferably comprises a floor 25 and at least one seat 26. The floor 25 extends, for example, between seat 26 and the lower vehicle body panel 20.

The warning system 18 comprises a first sensor 28, at least one vehicle trim element 30, a warning computer 32 connected to the first sensor 28 and the vehicle trim element 30 and a warning device 34 connected to the warning computer 32.

The first sensor 28 is configured to measure a first signal representative of the state of the vehicle door 16. The state of the vehicle door 16 is selected between an open and closed state.

The open state of the door 16 corresponds to the state of the door 16 when the door 16 is in its open position and the closed state of the door 16 corresponds to the state of the door 16 when the door 16 is in its closed position.

The first sensor 28 includes, for example, a contact or proximity sensor configured to measure the state of the door. For example, the first sensor 28 is arranged on a contour of the opening 22 and is configured to detect the contact of the door against the said contour of the opening 22.

In one embodiment of the invention, the warning system comprises as many first sensors 28 as there are doors 16, each first sensor being assigned to a door and being configured to measure a first signal representative of the state of the door 16 to which it is assigned.

Figure 4:
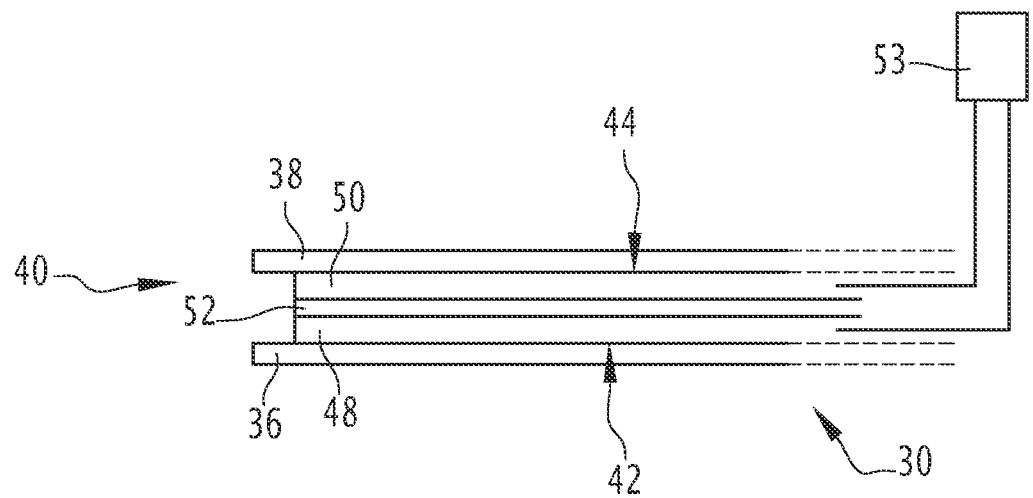
FIG. 4 is a schematic representation of a trim element of the warning system shown in FIGS. 1 to 3.

As shown in FIG. 4, the trim element 30 comprises at least one support layer 36, at least one appearance layer 38 and at least one second sensor 40.

Figure 5:
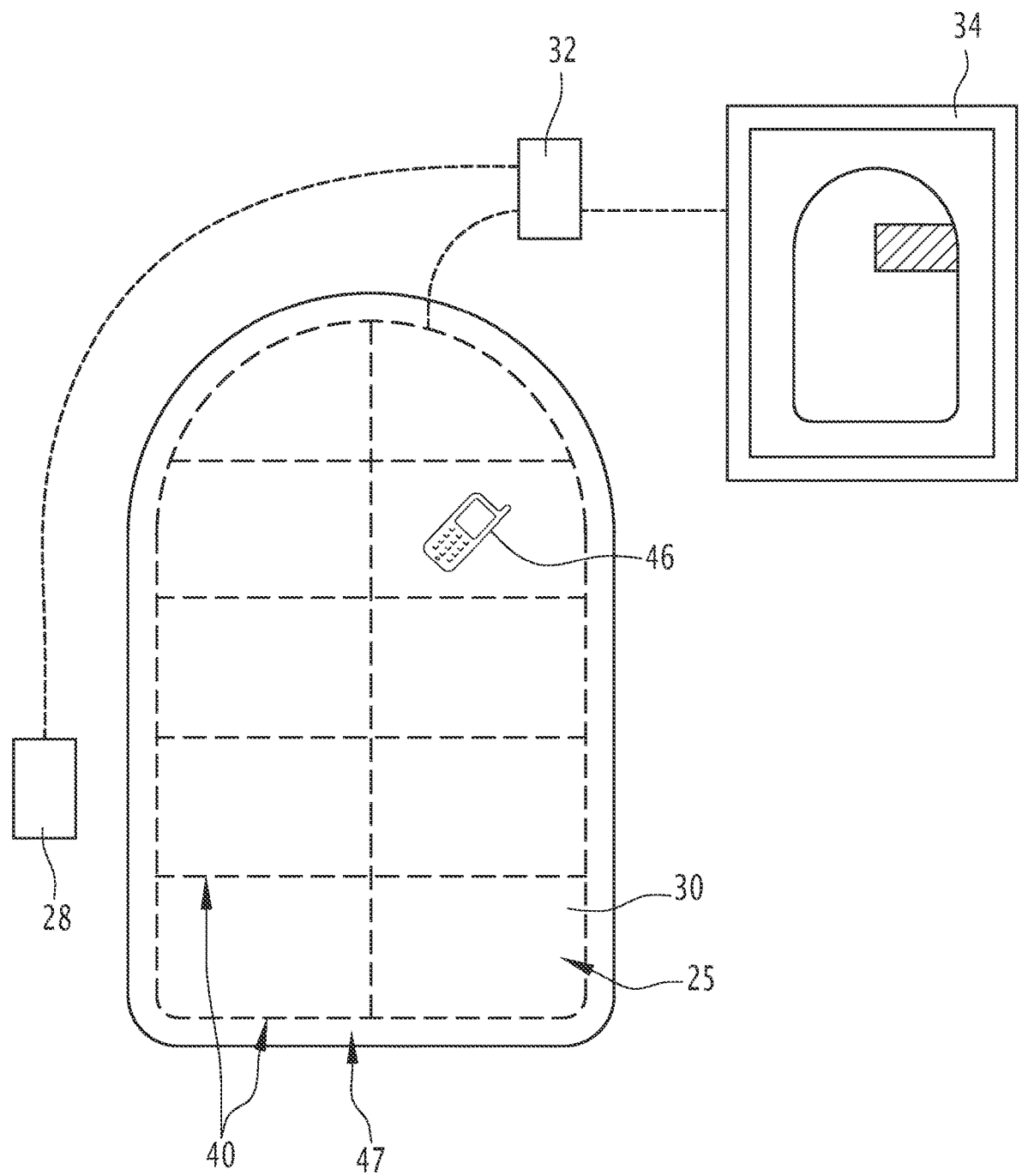
FIG. 5 is a similar view of several details of a warning system according to a second embodiment of the invention.
Figure 6:
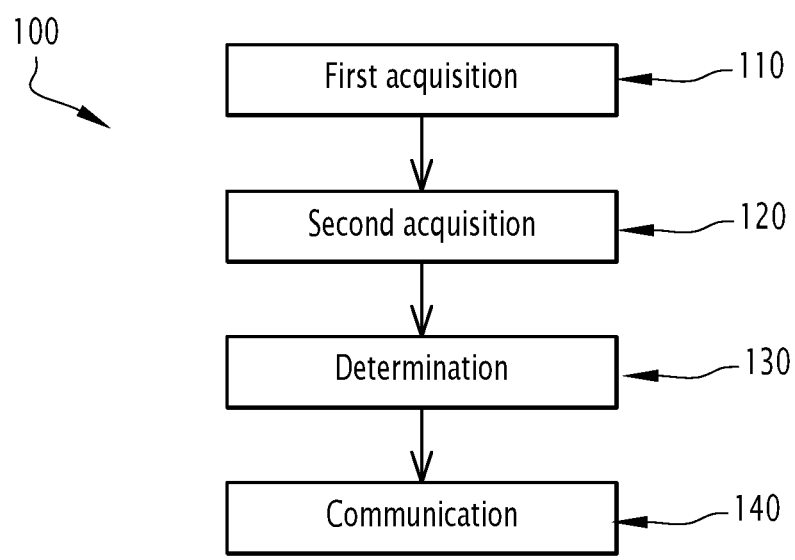
FIG. 6 is a flow chart of a method implemented by the warning system shown in FIGS. 1 to 5.

According to some embodiments of the invention, shown in FIGS. 1, 2 and 5, the trim element 30 forms the floor 25 of the vehicle 10. According to a variant not shown, the trim element 30 forms a substantially horizontally extending surface in the passenger compartment 14, such as the bottom of an empty pocket in the vehicle 10.

The support layer 36 preferably forms a sound absorption layer. In this case, for example, the support layer 36 contains at least one layer of sound-absorbing foam.

The support layer 36 extends, for example, over the floor of the lower vehicle body panel 20. The support layer 36 is for example, attached to the lower vehicle body panel for example, by means of an adhesive. The support layer 36 is then preferably adapted to conform to the shape of the lower vehicle body panel 20 over which it extends.

The thickness of the support layer 36 is preferably between 5 mm and 30 mm.

The support layer 36 preferably extends over an area, measured perpendicular to the thickness of support layer 36, of between 0.5 $m^2$ and 2 $m^2$.

The appearance layer 38 defines the side of the trim element 30 opposite to the side defined by support layer 36.

The appearance layer 38 is visible to a user in the passenger compartment 14.

The appearance layer 38 includes a carpet, for example.

The thickness of appearance layer 38 should preferably be between 2 mm and 10 mm.

The appearance layer 38 preferably extends over an area, measured perpendicular to the thickness of the appearance layer 38, comprising of between 0.5 $m^2$ and 3 $m^2$. For example, the appearance layer 38 extends over an area equal to the area of support layer 36.

The appearance layer 38 extends at least partially parallel to the support layer 36 and at least partially over the support layer 36.

The second sensor 40 is preferably arranged between the support layer 36 and the appearance layer 38.

The second sensor 40 comprises an underside 42 and a topside 44 defining the thickness of the second sensor between them.

The underside 42 of the second sensor 40 extends over the support layer 36 and the appearance layer 38 extends over the topside 44 of the second sensor 40.

The underside 42 of the second sensor 40 is preferably fixed, for example, glued to the support layer 36. The topside 44 of the second sensor 40 is preferably fixed, for example, glued to the appearance layer 38.

The thickness of the second sensor 40 is preferably between 0.1 mm and 2 mm.

The second sensor 40 preferably extends over an area, measured perpendicular to the thickness of the second sensor 40, of between 20 cm$^2$ and 3 m$^2$.

The, or all the second sensors 40 extend over at least 3% of the surface of at least one appearance layer 38.

The, or all of the second sensors 40 extend over no more than 100% of the surface of the at least one appearance layer 38.

The second sensor 40 here forms a flexible plate. Flexible plate means here that the plate initially extending according to one plane can be manually bent so that two planes tangential to the plate form an angle greater than 90° without damaging the second sensor.

The second sensor 40 is then adapted to conform to the shape of the support layer 36, and thus to the shape of the lower vehicle body panel 20.

The second sensor 40 is configured to measure a second signal representative of a force applied to the trim element, in particular a force applied transversely to the direction in which the trim element extends.

The second signal is representative of the force applied between the support layer 36 and the appearance layer 38. The second signal is thus representative of a force applied to the appearance layer 38 on the one hand and the reaction of a support of the support layer 36, such as the reaction of the lower vehicle body panel 20 on the support layer 36 on the other. The force applied to the appearance layer 38 is in particular the force generated by an object 46 resting on the appearance layer 38.

The object 46 shown in FIG. 1 is in particular a cell phone, wallet, notebook, luggage or any other object that a user of the vehicle 10 is likely to forget in the vehicle 10.

In the embodiment shown in FIG. 5, the trim element 30 comprises a plurality of second sensors 40. In this embodiment, the second sensors 40 are at least partially offset from each other in relation to a direction tangential according to the direction in which the appearance layer 38 extends to form a matrix 47 of the second sensors 40.

According to a first variant of this particular embodiment, as shown in FIG. 5, the second sensors extend in continuity with each other and do not overlap according to a direction perpendicular to the direction in which the second sensors 40 extend. As shown in FIG. 5, the sensors are, for example, placed edge to edge to form the matrix 47 of the second sensors.

According to a second variant not shown, at least two second sensors 40 are superimposed in the direction perpendicular to the direction in which the second sensors extend. According to this second variant, a first set of second sensors extends, for example, in a longitudinal direction perpendicular to the thickness of the second sensors 40 and a second set of sensors extends over the first set of second sensors in a longitudinal direction perpendicular to the longitudinal direction of the second sensors and to the thickness of the second sensors 40.

As shown in FIG. 4, each second sensor 40 comprises a first electrode 48, a second electrode 50, a sensing foil 52, and a control means 53.

For example, the first electrode 48 and the second electrode 50 each comprise a sensing foil 52 powered by an electric power source (not shown).

The voltage between the first electrode 48 and the second electrode 50 is, for example, between 1 V and 12 V.

For example, the first electrode 48 is attached to the support layer 36 and the second electrode 50 is attached to the appearance layer 38.

The sensing foil 52 extends between the first electrode 48 and the second electrode 50 and is attached on one side to the first electrode 48 and on the other side to the second electrode 50.

The resistivity of the sensing foil 52 is variable depending on the force applied on either side of the sensing foil 52.

For example, the resistivity of the sensing foil 52 decreases with increasing force on either side of the sensing foil 52.

For example, the resistivity of the sensing foil 52 is substantially equal to $150 \times 10^7$ Ω/m$^3$ when the sensing foil 52 is at rest and substantially equal to $7 \times 10^7$ Ω/m$^3$ for a force equal to 10 N/dm$^2$ applied on both sides of the sensing foil 52.

The sensing foil 52 is for example a sheet known as Velostat™.

The control means 53 is connected to the first electrode 48 and the second electrode 50 and is configured to measure the second signal representative of the force applied to the trim element 30 as a function of the resistivity of the sensing foil 52.

The warning computer 32 includes an acquisition module 54 for acquiring the first and second signal and a determination module 56 for a warning data.

Figure 3:
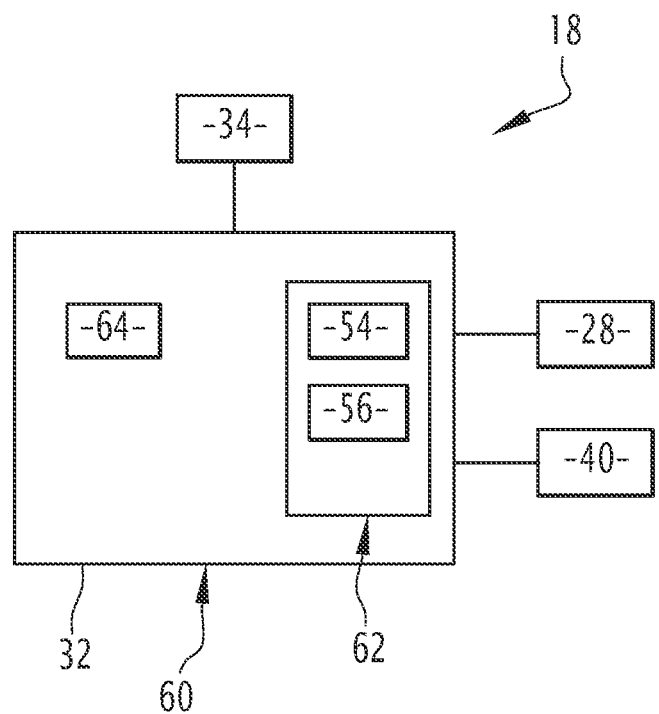
FIG. 3 is a schematic representation of the warning system shown in FIGS. 1 and 2.

In the example of FIG. 3, the warning 32 includes a data processing unit 60 formed by a memory 62 related to a processor 64.

In this example, the acquisition module 54 and the determination module 56 are each in the form of software executable by the processor 64. The memory 62 is then able to store a software for the acquisition of the first and second signal and a software for the determination of a warning data. The processor 64 of the data processing unit 60 is then able to execute the acquisition software and the determination software.

In the variant not shown, the acquisition module 54 and the determination module 56 are each implemented as a programmable logic component, such as an FPGA (Field Programmable Gate Array), or as a dedicated integrated circuit, such as an ASIC (Application Specific Integrated Circuit).

If the warning computer 32 is implemented as one or more software programs, i.e., as a computer program, it is also suitable for storage on a device that is not shown and can be read by a computer. The computer-readable device is, for example, a device capable of storing electronic instructions and of being coupled to a bus of a computer system. For example, the readable device is an optical disk, magneto-optical disk, ROM, RAM, any type of non-volatile memory (for example, EPROM, EEPROM, FLASH, NVRAM), magnetic card or optical card. On the readable device is then stored a computer program containing software instructions.

The acquisition module 54 is configured to acquire the first signal from the first sensor 28 and the second signal from the second sensor 40.

In the variant according to which the warning system comprises a plurality of first sensors 28 and/or a plurality of second sensors 40, the acquisition module is configured to acquire each first signal from each first sensor and/or each second signal from each second sensor 40.

The acquisition module 54 is physically connected to the first sensor 28 and the second sensor 40, for example via a cable (not shown). Alternatively, the acquisition module 54 is connected to the first sensor 28 and the second sensor 40 via a wireless connection such as a radio or WIFI connection.

The determination module 56 is logically connected to the acquisition module 54 and is configured to receive the first signal and the second signal from the acquisition module 54.

The determination module 56 is configured to determine a warning data based on the first signal and the second signal.

The determination module 56 is configured to determine a warning data only if the first signal is representative of an open state of the door 16 and the second signal is representative of a force applied to the trim element 30 greater than a predetermined threshold force.

When the warning system includes a plurality of first sensors 28, the determination module 56 is configured to determine a warning data only if at least one first signal is representative of an open state of the door and if the second signal is representative of a force applied to the trim element 30 greater than a predetermined threshold force.

The determination module is configured not to determine a warning data if the, or each first signal is representative of a closed state of the door and/or if the second signal is representative of a force applied to the trim element less than or equal to the predetermined threshold force.

In a particular variant, the determination module 56 is configured to determine a warning data if the second signal representative of a force applied to the trim element 30, greater than the predetermined threshold force, is acquired by the acquisition module prior to the acquisition of the or a first signal representative of an open state of door 16 by the acquisition module 54.

According to this particular variant, the determination module 56 is configured not to determine a warning data if the second signal representative of a force applied to the trim element 30, greater than the predetermined threshold force, is acquired by the acquisition module following the acquisition of the or a first signal representative of an open state of the door 16 by the acquisition module 54.

The predetermined threshold force corresponds to a pressure for example between 3 kg/m$^2$ and 10 kg/m$^2$, and for example to a pressure of approximately 5 kg/m$^2$. The predetermined threshold force corresponds in particular to a force which is less than the force applied by an object 46 as mentioned above to the trim element 30 when it is at rest on the trim element 30.

In the variant shown in FIG. 1 in which the warning system 18 includes a single trim element comprising a single second sensor, the determination module 56 is configured to determine a warning data such as binary data to signal a warning if it is determined and not to signal a warning if it is not determined.

In the variant shown in FIG. 5, in which the trim element 30 comprises a plurality of sensors, the determination module 56 is configured to determine a warning data based on the first signal and the second signal of each second sensor 40. The warning data is determined as a function of the second sensor(s) measuring a second signal representative of a force greater than the predetermined threshold force. The warning data then includes information on the location of the force exceeding the predetermined threshold force. In particular, the location information corresponds to the identifiers of the second sensor(s) measuring a second signal representative of a force greater than the predetermined threshold force.

The warning device 34 is configured to receive the warning data determined by the determination module 56 and to communicate the warning data to a vehicle user.

For example, the warning device 34 is configured to communicate the warning data visually and/or audibly.

The warning device 34 is integrated into a human-machine interface in the passenger compartment 14.

For example, the warning device 34 includes a suitable loudspeaker to communicate the warning data. If the warning system 18 has only one second sensor 40, the loudspeaker is configured to communicate the warning data by generating an alarm or voice message indicating the presence of an object 46 on the trim element 30. When the warning system 18 has a plurality of second sensors 40, the loudspeaker is preferably configured to communicate the warning data by generating a voice message indicating the location of the object or to generate, in conjunction with one or more complementary loudspeakers, an alarm the spatial evolution of which is dependent on the location of the object.

The warning device 34 includes for example a light or a screen. If the warning system 18 has only one second sensor 40, the light or screen is configured to communicate the warning data by illuminating or displaying a warning message indicating the presence of an object 46 on the trim element 30. When the warning system 18 comprises a plurality of second sensors 40, the light or display is preferably configured to communicate the warning data by indicating the location of the object on a representation of the passenger compartment 14, as shown as an example in FIG. 5.

In a variant not shown, the warning system 18 comprises a plurality of trim elements 30. According to this variant, the warning system then comprises a plurality of second sensors 40 and the operation of such a system is analogous to the operation of a warning system as shown in FIG. 5 and described above, in which the trim system comprises a trim element 30 comprising a plurality of second sensors 40.

A warning method 100 for implementation in a vehicle 10 using a warning system 18 as previously described will now be presented.

The warning method 100 comprises a first acquisition step 110 followed by a second acquisition step, a determination step 130 and then a communication step 140.

The first acquisition step 110 corresponds to an acquisition step of a second signal representative of a force applied to the trim element 30, greater than the predetermined force. In this step, the acquisition module 54 acquires a second signal, for example related to the presence of an object 46 on the trim element 30. In this first acquisition step 110, the acquisition module 54 sends the second signal to the determination module 56, representative of the force applied to the trim element 30, greater than the predefined force.

The second acquisition step 120 corresponds to an acquisition step of a first signal representative of an open state of the door. In this step, the acquisition module acquires a first signal, for example following the opening of a door 16 of the vehicle 10 by the user. The acquisition module 54 sends to the determination module 56, during this second acquisition stage 120, the first signal representative of an open state of the door 16.

During the determination step 130, the determination module 56 determines a warning data according to the first signal and the second signal acquired during the first acquisition step 110 and the second acquisition step 120. In particular, a warning data is determined in the determination step 130 if the first acquisition step 110 of a second signal representative of a force applied to the trim element, greater than the predetermined threshold force and if the second acquisition step 120 of a first signal representative of an open state of the door are completed.

In the communication step 140, the warning device 34 communicates the warning data determined in the previous determination step 130 to the user.

A warning system 18 comprising a determination module 56 configured to determine a warning data if the state of door 16 is an open state and the force applied to the trim element is greater than the predetermined threshold force alone is particularly advantageous, since it enables the communication of a warning data when the user opens the door 16 while forgetting an object 46 on the trim element 30.

A determination module 56 that determines a warning if the second signal representative of a force applied to the trim element, greater than a predetermined threshold force is acquired by the acquisition module 54 prior to the acquisition of the first signal representative of an open state of the door 16 is particularly advantageous for communicating the warning to the user when an object in the passenger compartment 14 is forgotten. Such a warning system 18 limits, for example, unnecessary warnings, for example, by not communicating warning data if the user opens the door before placing an object 46 on the trim element 30.

Alternatively, to avoid an unnecessary warning, it may be useful to use existing passenger presence sensors in the vehicle, such as seat sensors.

The threshold force value is particularly suitable for detecting objects that may be forgotten by a user in the passenger compartment 14.

Particularly beneficial for user comfort are the support layer 36 and appearance layer 38 forming sound absorption layers and carpeting.

The structure of the second sensor 40 and its position in the trim element 30 is particularly suited to its integration in the passenger compartment 14 by limiting its volume.

The use of the trim element 30 to form a floor 25 enables the user to be warned of objects forgotten on the floor.

The use of a plurality of second sensors 40 and a warning data including location information is particularly advantageous to indicate to the user the position of the forgotten object 46 and thus enable the user to quickly find any forgotten object 46.

The invention claimed is:

1. A warning system for installation in a vehicle, the system comprising:
   a first sensor configured to measure a first signal representative of the state of a door of the vehicle, the state of the door being selected between an open state and a closed state,
   at least one trim element for a vehicle comprising:
   at least one support layer,
   at least one appearance layer, and
   a plurality of second sensors configured to measure a second signal representative of a force applied to the said trim element, wherein the plurality of second sensors are at least partially offset from each other in a direction tangential to the appearance layer to form a line or matrix of second sensor, and wherein at least two of the plurality of second sensors are superimposed in the direction perpendicular to the direction in which the second sensors extend,
   a warning computer comprising:
   an acquisition module configured to acquire the first signal from the first sensor and the second signal from the second sensor, and
   a determination module, configured to determine a warning data based on the first signal and the second signal, and
   a warning device configured to receive the warning data and to communicate the warning data to a user,
   wherein the determination module is configured to determine the warning data if the first signal is representative of an open state of the door and the second signal is representative of a force applied to the trim element greater than a predetermined threshold force,
   and wherein the trim element forms a floor of a vehicle, the trim element being intended to extend between seats and a lower vehicle body panel of the vehicle.

2. The warning system according to claim 1, wherein the determination module is configured to determine the warning data if the second signal representative of a force applied to the trim element, greater than a predetermined threshold force, is acquired by the acquisition module prior to the acquisition of the first signal representative of an open state of the door.

3. The warning system according to claim 1, wherein the predetermined threshold force corresponds to a pressure of between 3 kg/m$^2$ and 10 kg/m$^2$.

4. The warning system according to claim 1, wherein the at least one appearance layer forms a carpet layer and the at least one support layer forms a sound absorption layer.

5. The warning system according to claim 1, wherein each second sensor comprises:
   a first electrode of the second sensor,
   a second electrode of the second sensor, and
   a sensing foil disposed between the first electrode and the second electrode, the resistivity of the sensing foil being dependent on the force applied to the sensing foil.

6. The warning system according to claim 1, wherein the determination module is configured to determine a warning data as a function of the first signal and the second signal from each second sensor, the warning data being determined as a function of the second sensor(s) measuring a second signal representative of a force greater than a predetermined threshold, the warning data comprising location information calculated from the signal received from each second sensor.

7. The warning system according to claim 1, wherein the warning device is configured to communicate the warning data visually and/or audibly.

8. The warning system according to claim 1, wherein the, or each second sensor is disposed between the at least one support layer and the at least one appearance layer.

9. The warning system according to claim 1, wherein the, or each second sensor extends over at least 3% of the surface of the at least one appearance layer.

10. A vehicle comprising the warning system of claim 1.

11. A warning method for use in a vehicle having the warning system of claim 1, comprising the following steps:
   acquiring a second signal representative of a force applied to the trim element greater than the predetermined threshold force, then acquiring a first signal representative of an open state of the door, then determining a warning data according to the first signal and the second signal, then communicating the warning data to a user.

12. A warning system for installation in a vehicle, the system comprising:
- a first sensor configured to measure a first signal representative of the state of a door of the vehicle, the state of the door being selected between an open state and a closed state,
- at least one trim element for a vehicle comprising:
  - at least one support layer,
  - at least one appearance layer, and
  - a plurality of second sensors configured to measure a second signal representative of a force applied to the said trim element, wherein the plurality of second sensors are at least partially offset from each other in a direction tangential to the appearance layer to form a line or matrix of second sensor, and wherein at least two of the plurality of second sensors are superimposed in the direction perpendicular to the direction in which the second sensors extend,
- a warning computer configured to:
  - acquire the first signal from the first sensor and the second signal from the second sensor, and
  - determine a warning data based on the first signal and the second signal, and
- a warning device configured to receive the warning data and to communicate the warning data to a user, wherein the warning computer is further configured to determine the warning data if the first signal is representative of an open state of the door and the second signal is representative of a force applied to the trim element greater than a predetermined threshold force, and wherein the trim element forms a floor of a vehicle, the trim element being intended to extend between seats and a lower vehicle body panel of the vehicle.

* * * * *